March 27, 1956
L. J. MOULTON
2,739,577
FUEL CONTROL SYSTEMS
Filed Dec. 4, 1952
2 Sheets—Sheet 1
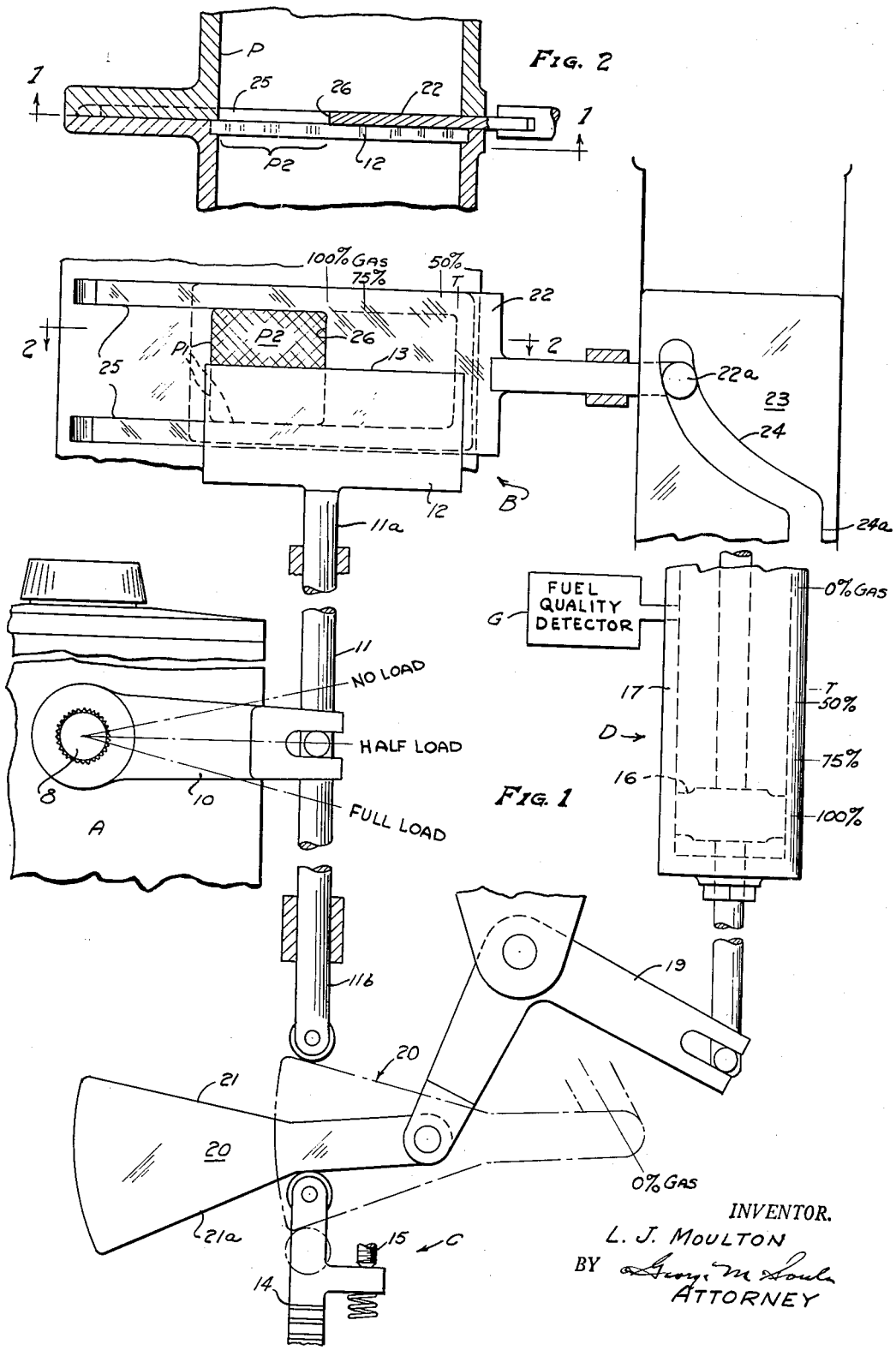
INVENTOR.
L. J. MOULTON
BY George M. Soule
ATTORNEY

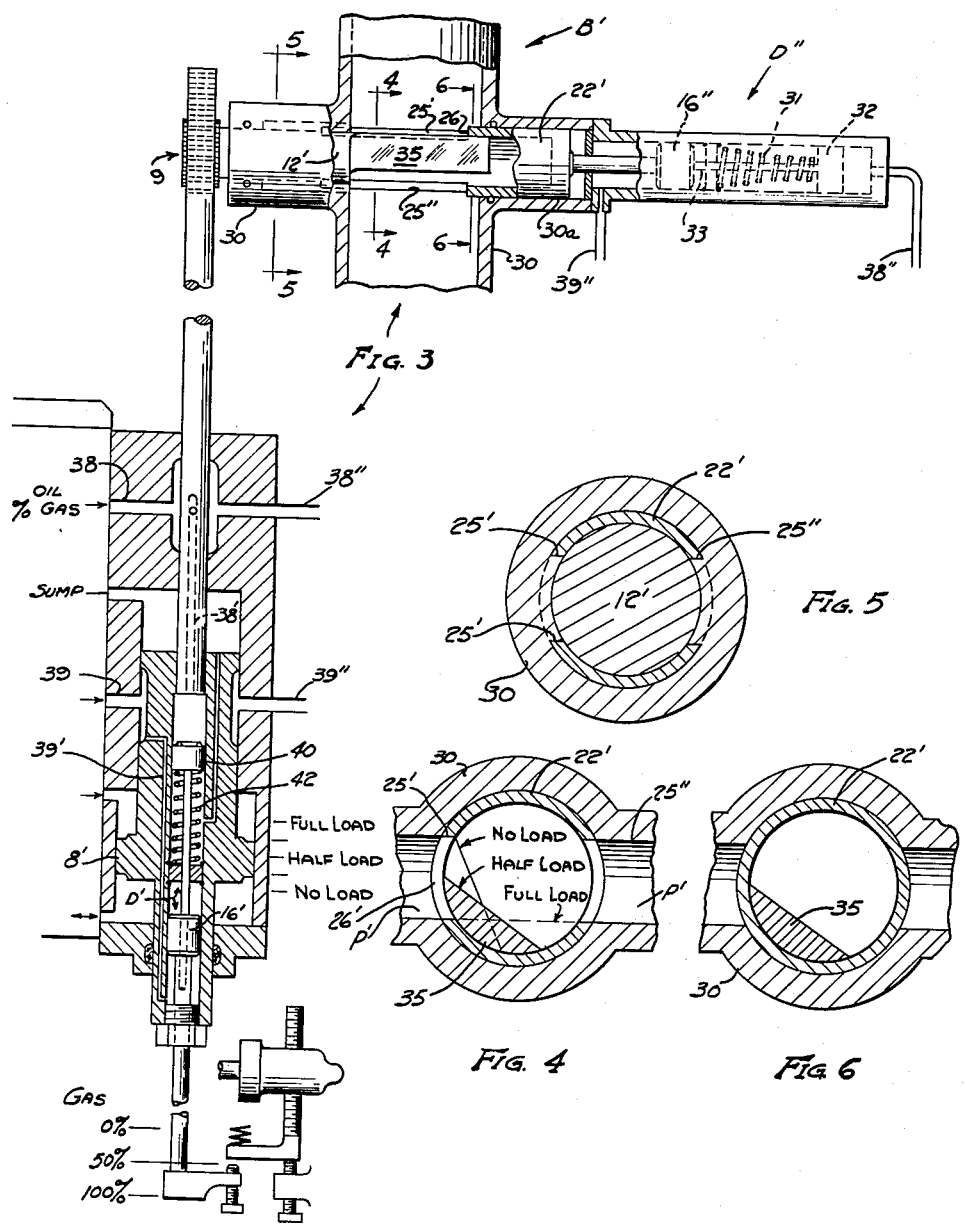

United States Patent Office 2,739,577
Patented Mar. 27, 1956

2,739,577

FUEL CONTROL SYSTEMS

Lloyd Jackson Moulton, Mentor, Ohio, assignor to The Marquette Metal Products Company, Cleveland, Ohio, a corporation of Ohio Application December 4, 1952, Serial No. 324,056

13 Claims. (Cl. 123—27)

The invention relates to a governor operated, fuel control system for internal combustion engines which are capable of operating on at least two different types of fuel, e. g. gas and oil.

One object of the invention is to provide a new or improved dual fuel engine control mechanism wherein means connected with an output member of a governor for the engine effect selective and/or proportional metering of two fuels, having different characteristics in respect to metering, to meet various load demands; and, when and if complete failure of one fuel occurs, automatically substitutes the other fuel for it in proper quantity to carry the load.

Another object is to provide an automatically operating engine gas and oil control mechanism operative (a) to insure the carrying of desired loads at the required speeds without possibility of overloading the engine as by concurrent use of gas and oil and (b) to insure the full use of one of the fuels (e. g. the gas) under all customarily practiced conditions of its supply before supplementing or replacing it with a second fuel.

Another object is to provide an improved governor-actuated dual fuel engine control mechanism operable automatically to determine selection and proportioning of the two fuels and which enables full governor output stroke (as of a servomotor or terminal shaft of the governor) for the metering of each fuel.

A further object is to provide an improved automatic, dual-condition-responsive, gas metering valve mechanism particularly for internal combustion engines which are operable at least part of the time on gas.

A specific object is to provide an improved gaseous fuel metering valve mechanism, particularly for governor controlled engines operable at least part of the time on gas, so arranged that, despite variations in the capability of the gas within its useful load range to carry desired loads, such variations cannot result in changing of speed droop adjustment from its set value and, in A. C. network systems, cannot cause the governor controlled engine to fail to carry its proper share of the total load.

Other objects and features of the invention will become apparent from the following description of the illustrative embodiments shown in the accompanying drawings wherein:

Fig. 1 is a schematic assembly view showing one form of dual fuel engine control mechanism hereof.

Fig. 2 is a sectional detail view taken as at 2—2 on Fig. 1.

Fig. 3 is a view similar to Fig. 1 showing essentially the same mechanism adapted for embodiment in or connection for operation by a hydraulic governor for engines.

Figs. 4, 5 and 6 are detail, relatively enlarged, sectional views of the gas valve portion of the mechanism of Fig. 3 taken as conventionally indicated on Fig. 3.

Engine governor A, as in Fig. 1 for example, can be of any suitable type (e. g. with adjustable permanent speed droop) and is shown as having an output member in the form of a terminal shaft 8 with an arm 10 the free end of which moves through a range of positions from zero fuel to full fuel, each position thus corresponding to a particular loading of the engine the governor is adjusted to control (typical fuel positions given as load on the drawing). Gas is assumed to be the preferred, hence first used fuel for operating the engine under load.

Governor output is further represented by a rod or link 11, the upper end portion 11a of which is connected for positioning one of two gas-port-area-varying plug elements or members 12 and 22 of a gas metering or throttle valve mechanism B. The valving members 12 and 22 are shown, for simplicity of illustration and explanation, relatively overlapping flat plates of rectangular form adapted to open and close similarly shaped gas conduit passage P partly defined by the inner peripheral walls of the conduit adjacent said plates. Plate member 12 to which the governor terminal shaft is connected is suitably guided for movement in a fixed path (vertical on the drawing) at right angles to the fixed path of movement of plate 22.

Lower end portion 11b of the link 11 is arranged for operating connection with oil metering mechanism C of the engine, (represented by an end portion of a conventional diesel fuel rack 14 held in engine-pilot-oil-supplying position—for ignition— as by an adjustable stop 15.) Operation of link portion 11b to meter oil is made, by reason of mechanism not yet described, contingent upon an engine-operating-capability characteristic of the gas (for example its pressure when the gas composition is constant), the pressure being suitably detected by means G, not shown in detail, and motion proportional to variations in the pressure being transmitted to the oil metering linkage as by a fluid pressure operated motor mechanism D and output portion only of which is intended to be illustrated. Suitable fuel-quality-detecting means for use herewith, as the input of mechanism D, can, for example, be those disclosed in L. J. Moulton Patent 2,690,167, issued September 28, 1954, or his application Ser. No. 273,438, filed February 26, 1952, both entitled Dual Fuel Engine Control System.

Motor mechanism D, as partially shown in Fig. 1, includes a displacement element or piston 16 slidable in a fixed cylinder 17, the piston being caused to move to various positions each corresponding to a different effective pressure of the gas supply within a useable range of pressures. The indicated "100%" position of the piston 16 is that assumed to be occupied when the gas, at full throttle, is capable of operating the engine at peak output torque or full load. Thus "100%" means flow pressure of the gas, and is synonymous with normal or rated gas pressure as those terms are used herein. The governor, through gas metering member 12 of mechanism B is in full control of the gas at rated pressure; and the design is such that said member 12 is operated by the governor to control gas at rated pressure from no load terminal shaft position to full load position exactly as the oil metering linkage is operated from pilot oil position to full load position, unassisted by gas. When piston 16 of mechanism D is moving from position "T" (for gas threshold) to "0%" it is assumed that no gas is enabled to flow to the engine. That motion of piston 16 (in either direction between "0%" and "T") is assumed to take place rapidly.

When a single motor mechanism D is used, as in Fig. 1, for operation of mechanisms B and C, movement of its output or displacement element (piston 16) is, by design, a linear function of actuating fluid pressure, as is intended to be indicated by the uniform spacing of the graduations "50," "75" and "100" beside cylinder 17. The displacement element of mechanism D and other similarly operated mechanisms hereof can be designed for direct operation by engine supply gas or indirect operation; hence "gas-pressure-responsive" and similar terms as used herein are to be interpreted broadly. Piston 16 is preferably operated by oil the pressure of which is regulated as a function of engine gas supply pressure (oil pressure maintained proportional to gas pressure), as explained, for example, in L. J. Moulton application Ser. No. 273,438 identified above. That application discloses suitable slave motor means, called a "power head," whereby a piston or output element such as 16 of mechanism D hereof is oil-pressure-operated in opposite directions, thus having adequate fuel-linkage-operating force despite frictional and other restraining or biasing influences on the linkage. A slave motor arrangement similar to that of said application is, incidentally, somewhat diagrammatically shown hereby in the governor servomotor of Fig. 2, described later.

Effective gas pressure responsive mechanism D acts, in conjunction with the governor, on and through the oil fuel metering linkage mechanism C and also on and through part 22 of the gas metering valve mechanism B to maintain proper fuel selection and, when both fuels are used, proper proportioning thereof in accordance with effective gas pressure versus load as will be further explained by typical examples later herein. The parts of mechanisms A, B, C and D as shown by Fig. 1 are in the relative position appropriate to half load and normal or rated gas pressure.

For automatically adjusting the effective stroke of governor output arm 10 with respect to the oil metering mechanism C as a function of effective gas pressure variations within the useable range and for causing complete conversion to oil at less than threshold pressure, piston 16 of mechanism D, as through a bellcrank 19 and connected cam or distance piece member 20 having one or more ramp or cam surfaces 21, 21a, acts essentially to lengthen governor-output-connected rod 11 in direct proportion to any amount of gas failure which may occur so long as gas is being admitted to the engine and to its maximum length when no gas is being admitted. Thus, as will be apparent, only pilot oil is now being supplied; oil sufficient to carry one half load will, through appropriate repositioning of member 20, be supplied to supplement the gas when piston 16 has been moved to its "50%" effective gas-pressure-indicating position; and, in case of complete gas failure (piston 16 then assumed to have arrived at "0%," thus repositioning member 20 as indicated by broken lines) oil alone will be supplied in sufficient quantity to carry the load. One reason for using an oil pressure, two-way-operated motor device D is that, when partial or complete gas failure occurs during engine operation, the distance piece 20 has to act to cam the fuel racks 14 in the direction to increase oil.

Because of mechanical difficulties which would become involved in designing the gas valve mechanism B or its actuating means to enable use of engine-operating gas at any pressure below rated pressure and, further, in view of the fact that in practice a threshold pressure in the neighborhood of 50% flow pressure is usually established by automatically operating gas pressure regulating and cut off means (not shown herein), the portions of mechanism B which are controlled or adjusted in response to variations in the effective gas pressure are shown as arranged to accommodate gas pressure variations within definite high and low limits. These, theoretically at least, can be extended indefinitely in either direction.

Throttle valve plate member 22, as shown in Fig. 1, has a slot 25 the side edges of which are shown as spaced apart a distance equal to the vertical dimension of gas conduit passage P, the slot terminating at vertical metering-edge-forming surface 26 which co-operates with other wall elements, particularly the upper metering edge 13 of valve plate 12, to establish an effective gas port area P1 (shown square) half of which (unshaded portion of P1) is now eclipsed by the upper margin of plate 12. Port areas equal to P1 will be referred as "maximum port opening," meaning large enough to admit gas at normal or rated pressure sufficient to carry full or rated engine load.

For positioning or adjusting the gas metering valve mechanism B (throttle plate element 22 thereof) as a function of gas pressure variations, piston 16 of mechanism D is assumed to be connected to a motion converting cam 23 shown as a slidably guided member having a cam groove or slot 24 embracing a follower 22a connected to the throttle element 22. The slot has an "idle" portion 24a a portion only of which is shown. When the gas pressure has dropped to the point at which the automatic regulating valve equipment, not shown, is adjusted to cut off all flow of gas, slot portion 24a permits the piston 16 to move to its "0%" position without imparting further movement to the throttle element 22. The cam 23 is designed to convert the desired amount of the total movement of piston 16 which is proportional to gas pressure variations within the useable range into disproportionate movement of the throttle element 22 such as will automatically compensate for the fact that, as the gas supply pressure drops from its rated or normal value, progressively larger and larger effective gas valve port opening is required to carry a given engine load. The relationship between effective gas pressure and required gas port opening, within the ability of the engine to carry varying loads solely on gas at below normal pressure, is as follows: The gas port opening expressed as a fraction of "maximum opening" equals the reciprocal of the gas pressure expressed as a fractional part of normal pressure multiplied by the load expressed as a fraction (e. g. fractional part of governor terminal shaft movement from no load to full load).

As already indicated, the illustrated relative positioning of movable valve elements 12 and 22, by establishing now-effective port P2, has adjusted the throttle so that the gas at its normal pressure carries half load. Should the gas pressure now drop to 75% of normal (metering edge 26 of valve plate 22 then opposite the "75%" indication) a total port area two thirds of that of maximum area P1 will result ($\frac{4}{3} \times \frac{1}{2} = \frac{2}{3}$); and twice that drop in pressure (valve edge 26 then moved to the indicated "50%" position) causes port area readjustment to maximum (equivalent of P1 which obviously is the proper area in such case).

The desirability, in connection with the specifically illustrated arrangement of valve elements 12 and 22, for converting gas-failure-responsive uniform movement of piston 16 per increment of failure into non-uniform movement, as of valve plate 22, can be illustrated, for example, by assuming one quarter load and 50% effective gas pressure. With governor-connected valve plate 12 rendering one quarter of the height of maximum opening area P1 effectual, the edge 26 of plate 22 must now be moved from its illustrated position a distance equal to the horizontal dimension of said area P1 in order to give a total port area half that of P1 ($\frac{2}{1} \times \frac{1}{4} = \frac{1}{2}$). Gas-pressure-responsive readjustment of valve plate 22 to a less extent for the conditions mentioned would require compensating (port-enlarging) movement of valve plate 12 by the governor, which would render the governor speed droop operation inaccurate (governor terminal shaft position then not an accurate indication of load). If the governed engine is operating in an A. C. network such inaccurate speed droop operation can cause the engine to fail to deliver useful torque because, in such service, load and speed are essentially and definitely interrelated as is well known.

By way of illustration of partial fuel conversion by the Fig. 1 illustrated mechanism, it will be apparent that at 75% effective gas pressure and full load, more than the "maximum port opening" (P1) is rendered available by load-responsive adjustment of valve plate 12 to its lowermost position and gas-pressure-responsive adjustment of valve plate 22 to the right of its illustrated position. Since gas at 75% effective pressure at full throttle can only carry 75% load, the cam member 20, in being moved to the right by mechanism D one fourth of the total distance required for operation solely on oil will enable the governor-connected rod portion 11b to move the racks the required distance to supplement the gas. In case of complete gas failure during operation at any load the piston 16 of mechanism D is moved at its maximum operating rate from gas-cut-off-indicating position "T" to its "0%" position, the cam surfaces 21 and 21a simultaneously transmitting the necessary fuel-readjustment movement to the racks.

The mechanism according to Figs. 3 to 6 is arranged to perform exactly the same functions as those described in connection with the Fig. 1 arrangement, hence only the structural differences will be explained. Incidentally the fuel-increasing direction of operation of governor servo-motor or power piston 8' of Fig. 3, as shown, is upwardly so that the fuel linkage movements are the reverse of those described in connection with Fig. 1. Power piston 8' is shown in half load position and effective-gas-pressure-responsive mechanism D' (serving in place of the oil-fuel-connected portions of mechanism D of Fig. 1 and being wholly supported by the power piston in Fig. 3) is illustrated in 50% effective gas pressure position of its parts, ready to commence to meter oil in case of further gas pressure failure or further increase in load. The type of governor intended to be represented in Fig. 3 is, for example, basically according to A. Kalin patent, 2,219,229, issued October 22, 1940, assuming, additionally, suitable adjustable speed droop mechanism.

Gas metering valve mechanism B', Fig. 3 includes an angularly movable or rotary plug element 12' in housing 30, the plug element being connected as by rack and pinion mechanism 9 to the power piston for automatic angular adjustment according to load. The plug 12' is in mating, telescoping relationship to a hollow plug element or sleeve 22' snugly fitting a mating bore 30a in the housing 30. The plug and sleeve are suitably designed to close respectively adjacent end portions of bore 30a through conventional sealing elements. For axial adjustment of it, the hollow plug or sleeve 22' is connected to a gas-pressure-responsive motor mechanism D" serving in place of the cam mechanism etc. of Fig. 1. Piston element 16" of motor D" is controlled in its movement to adjust plug element 22' as a non-linear function of the gas pressure (preferably oil pressure proportional to the effective gas pressure as already described). One means for causing the necessary gas-valve adjusting movement of piston 16" to be disproportionate to applied control input pressure is represented as a biasing spring 31 of variable rate, which spring acts on a fluid pressure-receiving piston 32 connected to a pilot valve plunger 33, the movement of which plunger determines that of piston 16" (follow-up action). The same motor arrangement is shown and more fully explained in L. J. Moulton application Ser. No. 273,439, filed February 26, 1952 (Dual Fuel Engine Control System).

In Figs. 4, 5, and 6, hereof, taken with Fig. 3, governor-connected gas valve plug element 12' is shown as having a segment portion 35 opposite the gas inlet and outlet defining walls (passage P') of the gas duct, and the sleeve element 22' has diametrally opposed slots 25' and 25" adjacent respective portions of the duct passage. One slot terminates at a control edge 26', transverse to the sleeve axis, for modifying the valving action of the governor-positioned rotary plug element 12' in essentially the same manner as already explained in connection with Fig. 1. In Fig. 4 "no-load," "half load" and "full load" positions of the valving or circumferentially directed marginal edge of the segment portion of plug element 12' are indicated partly by broken lines.

Referring further to the hydraulic governor mechanism A, as partly shown in Fig. 3, operating oil (pressure proportional to gas pressure) is preferably supplied through the governor case, as by line 38, and branches 38', 38" thereof, to motor mechanisms D' and D" the branches being continually connected respectively to the displacement chambers of those mechanisms as will be evident. Approximately constant pressure oil is supplied to the cylinders of slave pistons 16' and 16" of mechanisms D' and D" through the governor at passage 39, branching at 39' and 39" to respective cylinders. The entire gas control valve mechanism B', D" is thus adapted to be built into the governor case, although shown schematically for convenience as though it were a separate unit. In the case of motor mechanism D', which is built into the governor servomotor and whose operating oil with presure proportional to gas pressure acts on piston 40 to control the position of slave or power head piston 16' through pilot valve 42 connected to piston 40, the biasing spring 43 of piston 40 has a substantially constant rate. When and if, for example, the gas pressure decreases from any operating value, allowing spring 42 to force piston 40 upwardly, the fuel-metering effective movement of the servomotor piston, pursuant to load change and consequent governor action, is adjusted proportionally to the amount of decrease in the gas pressure.

Attention is called to application of L. J. Moulton, Serial No. 273,438, now Patent 2,734,490, Dual Fuel Engine Control System, issued February 14, 1956, and to application of L. J. Moulton, Serial No. 273,439 filed February 26, 1952, entitled Dual Fuel Engine Control System.

I claim:

1. In a fuel control system for an internal combustion engine, the combination of a governor for the engine having a movable fuel-controlling output member whose positions are approximately indicative of engine load, a device for detecting a variable quality of the fuel such as affects its engine operating capability, said device having fuel-quality-serving means operating independently of engine load and speed to evaluate or measure the quality of said fuel while enroute to the engine and a movable output member positioned in response to operation of said means, a metering valve mechanism for the fuel and comprising a metering valve element connected for adjustment by the governor output member, and a cooperating metering valve element connected for adjustment by the output member of said device in a manner to increase and decrease the flow rate of the fuel determinable by the governor-output-connected valve element.

2. In a control system for an internal combustion engine which is operable on a gaseous fuel, the combination of a governor for the engine having a movable fuel-controlling output element whose positions are normally indicative of engine load when operating on that fuel, a device for detecting a variable quality of the gas enroute to the engine, which quality affects the engine operating capability of the gas, said device having gas-quality-sensing means and a movable output member positioned in response to operation of said means, a valving mechanism for the gas and comprising a throttle valve element connected for adjustment by the governor output member, a cooperating throttle valve element connected for adjustment by the output member of said device in a manner to modify the gas throttling operation of the governor-output valve element, and means arranged to cause movement of the co-operating throttle valve element to be disproportionate to the movement of the output member of the device in a direction to decrease the throttling effect of said co-operating throttle valve element as the capability of the fuel to operate the engine decreases.

3. In a fuel control system for an internal combustion engine, the combination of a governor for the engine having a movable output member whose positions are approximately indicative of variable engine loads and which in one position indicates approximate absence of load, a device having a fuel-quality sensing means arranged for operation solely to measure the quality of the fuel enroute to the engine independently of engine load and speed and having a movable output member positioned in response to operation of said means, a metering valve mechanism for the fuel, said mechanism comprising a metering valve element connected for adjustment by the governor output member and capable of blocking flow of the fuel to the engine, and a cooperating metering valve element connected for adjustment by the output member of said device and operable thereby to modify all fuel metering operations of the first mentioned metering valve element.

4. In a dual fuel control system for an internal combustion engine operable on gas or oil fuel, the combination of a governor for the engine having a movable output member whose positions are approximately indicative of engine loads in respect to each of the fuels when used separately, a device having sensing means operative to detect variations in an engine operating characteristic of the gas fuel and a movable output element positioned in response to operation of said means, a gas metering valve mechanism, said mechanism comprising a metering valve element connected for positioning of it by the governor output element and capable of blocking flow of gas to the engine, a cooperating metering valve element connected for adjustment by the output member of said device and operable thereby to modify the fuel metering operations of the first mentioned metering valve element, means arranged for operation by said governor output element for metering oil fuel, and means responsive to variations in said characteristic of the gas fuel, the last mentioned means being connected for rendering the metering means for oil fuel effective and ineffective.

5. Engine fuel metering mechanism for combustible gas at variable pressures, said mechanism comprising, means forming a gas passage having fixed transverse dimensions, two relatively overlapping valve members, each in gas-flow-restricting relationship to the passage, one member being guided for movement of a valving marginal edge portion of it along a fixed path to open and close the passage, the other member being guided for movement transversely of said path and having a valving marginal edge portion spanning the entire passage and crossing said marginal edge of the first member whereby to enable modification of any effective gas-porting area, below maximum area, which the first member is capable of affording or conditionally establishing, variably acting means connected for moving the first member to different gas-flow-restricting positions and closing position in reference to the gas passage, and variably acting means connected for moving the second member as a function of varying pressure of the gas.

6. The mechanism according to claim 5 wherein the last mentioned means moves its connected member distances which double with each unit change in gas pressure in one direction.

7. Engine fuel metering mechanism for combustible gas at variable pressures, said mechanism comprising: gas-passage-defining fixed wall means, two movable valve-port-establishing members in relatively overlapping position transversely of the passage and whose valving edge portions are transversely of each other, one member being configured and arranged to fully close and variably open the passage and the other being configured and arranged to enlarge the effective area of any port below maximum which can be conditionally established through positioning of said one member, and separate means respectively connected to said members for automatically positioning them relative to the passage and to each other.

8. Engine fuel metering mechanism for combustible gas at variable pressures, said mechanism comprising: gas-passage-defining fixed wall means, two metering valve members separately movable in operatively the same portion of the passage to control flow of gas therethrough, one member being configured and arranged to fully close and variably open said portion of the passage and the other member being configured and arranged to enlarge the effective area of any gas port below maximum which can be conditionally established through positioning of said one member in said passage portion, means respectively connected to said members for positioning them relative to the passage, the means for positioning said other member being adapted and arranged for automatic operation in response to variations in the gas pressure.

9. An engine gas metering valve mechanism, comprising a hollow body having a longitudinal passage of fixed dimensions for conducting gas to the engine and having a bore transversely of the passage, relatively angularly movable, coaxial circular plug and sleeve elements occupying the bore and extending across the passage, the wall of the sleeve element having an axially extending radial opening therethrough substantially aligned with the passage and defined in part by an axially facing metering edge portion of the sleeve element, the plug element having a circumferentially directed marginal portion which defines another metering edge extending transversely of the metering edge of the sleeve element, variably acting means connected for turning one of said elements to cause said circumferentially directed marginal portion, in cooperation with the sleeve element adjacent its opening to conditionally establish a gas metering port area across the passage, and separate variably acting means connected for axially shifting the other element to complete establishment of the desired port area.

10. A gas metering valve mechanism, comprising hollow wall means forming a longitudinal passage of fixed dimensions for conducting gas and having a transverse bore, an angularly movable circular sleeve snugly occupying the bore and extending across the passage, a circular plug extending across the passage and snugly telescoping the sleeve, coaxially thereof, the wall of the sleeve having an axially extending radial opening therethrough substantially aligned with the passage and defined in part by an imperforate portion capable of closing said sleeve opening against passage of gas therethrough, a circumferentially directed margin of the plug portion providing another metering edge extending crosswise of the metering edge of the sleeve, means for turning the plug from a position in which its imperforate portion closes the passage into various gas port establishing positions, and means for relatively shifting the sleeve and plug axially to cause the metering edge of the sleeve to enlarge the gas-flow-enabling port area provided by turning of the plug.

11. In engine operating gas metering valve mechanism, which includes a body having a through gas-flow passage of fixed transverse dimensions at a region intersected by a body bore extending transversely of the passage, a sleeve member snugly occupying the bore and having an axial bore therein open at one end, an angularly movable circular plug member extending into the open end of the sleeve and, snugly telescoping its bore, the plug and sleeve members closing respective ends of the body bore beyond the gas passage, means including an axially extending radial opening in the sleeve member disposed for communication with the gas passage, an axially directed surface of the sleeve and which defines part of its radial opening forming a gas metering edge extending transversely of the bores, the plug member having an imperforate, D-shaped portion mating the bore of the sleeve member and providing a circumferentially terminating metering edge in relatively crossing relationship to the metering edge of the sleeve, said plug portion being of sufficient circumferential extent to enable it to eclipse the sleeve opening and variably restrict or prevent flow of gas therethrough, engine load responsive means connected to the plug member for turning its metering edge to various sleeve-opening-eclipsing positions, and gas-pressure-responsive means connected to one of the members for effecting relative axial movement thereof to cause the sleeve member through its metering edge to modify the area of any gas port conditionally established by adjustment of the metering edge of the plug member.

12. In a fuel control system for an internal combustion engine having a source of fluid fuel an engine operating quality of which is variable from datum value; a governor for the engine having a movable fuel control output member, a device operatingly arranged for detecting deviations from datum value of said fuel quality of said source, independently of engine load and speed, said device having a movable output member whose positions denote detected fuel quality deviations, metering valve means capable of varying the rate of flow of the fuel from said source to the engine, further characterized in that the metering valve means is connected for normal fuel flow rate adjustment by the governor output member and for modified, increased and decreased, fuel flow rate adjustment by the output member of said device as a consequence of deviations of said quality from datum value.

13. In a control system for an internal combustion engine having a source of gaseous fuel an engine operating quality of which is variable from datum value; a governor for the engine having a movable fuel control output member, a device capable of detecting and arranged to detect deviations from datum value of said quality of the fuel en route to the engine, said device having a movable output member whose positions denote detected fuel quality deviations, metering valve means operable to vary the area of a single effective aperture permitting flow of gas from said source to the engine, the governor output member being operatingly connected to the metering valve means for conditionally establishing an effective area of said aperture in consequence of governor operation, and the output member of said device being operatingly connected to the metering valve means and being capable of acting thereon to modify said conditionally established effective aperture area.

References Cited in the file of this patent

UNITED STATES PATENTS

| | | |
|---|---|---|
| 661,175 | Haigh | Nov. 6, 1900 |
| 2,374,844 | Stokes | May 1, 1945 |
| 2,438,663 | Greenland | Mar. 30, 1948 |
| 2,489,405 | Doyle | Nov. 29, 1949 |
| 2,612,145 | Steven et al. | Sept. 30, 1952 |

FOREIGN PATENTS

| | | |
|---|---|---|
| 117,628 | Australia | Oct. 13, 1943 |